(12) United States Patent
Withum et al.

(10) Patent No.: US 7,715,620 B2
(45) Date of Patent: May 11, 2010

(54) COLOR FORM DROPOUT USING DYNAMIC GEOMETRIC SOLID THRESHOLDING

(75) Inventors: Timothy O. Withum, Olney, MD (US); Kurt P. Kopchik, Washington, DC (US); Frederic Highland, New Midway, MD (US); Supreeth Hebbal, Eldersburg, MD (US); Summer C. Dasch, Crofton, MD (US); Stephanie M. Graham, Crofton, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 1093 days.

(21) Appl. No.: 11/341,305

(22) Filed: Jan. 27, 2006

(65) Prior Publication Data

US 2007/0177796 A1 Aug. 2, 2007

(51) Int. Cl.
G06K 9/00 (2006.01)
(52) U.S. Cl. ........................ 382/163; 382/162
(58) Field of Classification Search .............. 382/163, 382/162
See application file for complete search history.

(56) References Cited

U.S. PATENT DOCUMENTS

| | | | |
|---|---|---|---|
| 5,105,469 A | 4/1992 | MacDonald et al. | 382/17 |
| 5,221,920 A * | 6/1993 | Poynter | 345/591 |
| 5,251,265 A | 10/1993 | Döhle et al. | 382/3 |
| 5,251,271 A | 10/1993 | Fling | 382/44 |
| 5,454,050 A * | 9/1995 | Nakabayashi et al. | 382/165 |
| 5,483,351 A | 1/1996 | Mailloux et al. | |
| 5,724,440 A | 3/1998 | Funada et al. | 382/162 |
| 5,875,260 A | 2/1999 | Ohta | 382/162 |
| 5,912,993 A | 6/1999 | Puetter et al. | 382/275 |
| 6,023,530 A | 2/2000 | Wilson | 382/219 |
| 6,124,864 A | 9/2000 | Madden et al. | |
| 6,154,567 A | 11/2000 | McGarry | 382/219 |
| 6,208,753 B1 | 3/2001 | Braudaway et al. | 382/162 |
| 6,385,340 B1 | 5/2002 | Wilson | 382/218 |
| 6,469,706 B1 * | 10/2002 | Syeda-Mahmood | 345/589 |
| 6,477,275 B1 | 11/2002 | Melikian et al. | 382/217 |
| 6,490,374 B2 | 12/2002 | Puetter et al. | 382/265 |

(Continued)

OTHER PUBLICATIONS

International Search Report and The Written Opinion of The International Searching Authority, or The Declaration. International Application No. PCT/US 07/61069. Mailing Date: Mar. 10, 2008.

(Continued)

Primary Examiner—Samir A Ahmed
Assistant Examiner—Li Liu
(74) Attorney, Agent, or Firm—Marsh Fischmann & Breyfogle LLP

(57) ABSTRACT

Dropping out of color form backgrounds from images of completed forms to obtain color form dropout images retaining only the respondent information. In one embodiment, a color form image processing method (100) includes retrieving (102) a template image, retrieving (104) a respondent image, registering (106) the images against one another to establish correspondence between pixels in the respondent and template images, dilating (108) the template image, and performing (110) a color form dropout including comparing (112) corresponding pixels in the respondent and dilated template images, and determining (114) whether to keep corresponding pixels by applying (116) a geometric solid threshold comparison to assess both color similarity and relative darkness, and removing (118) pixels from the respondent image based on such comparison.

17 Claims, 8 Drawing Sheets

U.S. PATENT DOCUMENTS

| | | |
|---|---|---|
| 6,628,829 B1 | 9/2003 | Chasen .................... 382/167 |
| 6,636,634 B2 | 10/2003 | Melikian et al. ............ 382/217 |
| 6,707,940 B1 | 3/2004 | Qian ........................ 382/173 |
| 6,757,426 B2 | 6/2004 | Link et al. ................ 382/163 |
| 6,788,812 B1 | 9/2004 | Wilkins .................... 382/167 |
| 6,950,553 B1 | 9/2005 | Deere |
| 2002/0025066 A1* | 2/2002 | Pettigrew ................. 382/162 |
| 2002/0136447 A1 | 9/2002 | Link et al. ................ 382/163 |
| 2002/0150291 A1 | 10/2002 | Naf et al. .................. 382/162 |
| 2003/0002740 A1 | 1/2003 | Melikian et al. ............ 382/217 |
| 2003/0007699 A1 | 1/2003 | Trifonov et al. ............ 382/275 |
| 2003/0012452 A1 | 1/2003 | Trifonov et al. ............ 382/275 |
| 2003/0012453 A1 | 1/2003 | Kotlikov et al. ............ 382/275 |
| 2004/0042657 A1* | 3/2004 | Barton ..................... 382/173 |
| 2004/0057614 A1* | 3/2004 | Ogatsu et al. .............. 382/162 |
| 2004/0179738 A1 | 9/2004 | Dai et al. .................. 382/218 |
| 2007/0165945 A1* | 7/2007 | Goma et al. ............... 382/167 |

OTHER PUBLICATIONS

Savakis, Andreas E. and Brown, Chris R. "Document Processing for Automatic Color Form Dropout." SPIE Applications of Digital Image Processing, San Diego CA, Jul. 2001.

* cited by examiner

— 200

Sample Form

Name: _____

Age: _____

Sex: _____

Sample Form

Name: JOHN _____

Age: 56 _____

Sex: Male _____

Sample Form

Name: _____

Age: _____

Sex: _____

FIG.4

COLOR FORM DROPOUT USING DYNAMIC GEOMETRIC SOLID THRESHOLDING

FIELD OF THE INVENTION

The present invention relates generally to processing images of forms having information entered thereon, and more particularly to processing images of forms having a color background.

BACKGROUND OF THE INVENTION

When electronically processing a document such as, for example, a survey form or the like having respondent information entered thereon, it is often desirable to remove or dropout the background of the document from a scanned image of the document. Doing so isolates the respondent information from the background of the form thereby facilitating storage of the image and subsequent processing of the respondent information therein. Removal of color backgrounds from a color form is often done using bitonal scanners. Bitonal scanners use a particular color of bulb, thereby effectuating removal of particular colors of ink from the scanned images of the documents. For example, red bulbs are typically used to remove form backgrounds which are composed of a red hue. Forms are designed to take advantage of this by creating backgrounds that predominantly consist of a single of color ink (e.g., a dropout color) so that the background is dropped from the form when it scanned using a bitonal scanner with the proper color bulb. Unfortunately the bitonal scanner also removes any respondent information that is written in a color similar to the dropout color (e.g., in red pen).

Another technique applied to remove backgrounds from bitonal images of scanned documents is pixel-by-pixel comparison of the bitonal image with a template image. After the bitonal image is obtained from the bitonal scanner it is registered against a bitonal template. The registered bitonal image is compared pixel-by-pixel against a dilated version of the bitonal template. Determining which pixels to keep for a bitonal form dropout is much easier because there are only two possible values for each pixel, namely black and white. Only those pixels where the respondent pixel is black and the dilated template image is white are kept in the dropout image.

An alternative to bitonal scanning is color scanning. Color scanning is advantageous over bitonal scanning because it does not eliminate colors from the resulting image. However, the foregoing pixel-by-pixel comparison techniques used for bitonal images are ineffective on color images because each of the pixels can be a multitude of different colors. One common method of addressing this issue for color images is to select particular colors on the form to dropout of the entire form. All colors on the entire form that are the same as the particular colors are removed, but if the respondent wrote in a color that is the same or similar enough to one of the dropout colors, the respondent data is removed as well.

SUMMARY OF THE INVENTION

The present invention provides for removal or dropping of color form backgrounds from images of completed forms based on determining distances within a color space between corresponding color pixels in the image and a template, while recognizing that the same color dropout criteria do not necessarily need to be applied to the entire image. The present invention is advantageous because the dropout algorithm variables can be dynamically changed. Such adjustment can be based on relative locations on the image, detected respondent information color, and other factors. Areas closer to write-in fields can have a tighter threshold than areas further away. The present invention also provides the ability to tighten thresholds depending on the properties of the color used by the respondent in the write in fields. Since the present invention does not select particular colors to be removed from the form as a whole, respondent information can be kept even though it may be similar to or even identical to a template color on another part of the form.

According to one aspect of the present invention, a method for processing an image of a color form having respondent information entered thereon to remove the color background from the form includes retrieving a template image that is comprised of a plurality of pixels representing the form without any respondent information entered thereon (e.g., a blank form). The method also includes retrieving a respondent image that is comprised of a plurality of pixels representing the form and the respondent information entered thereon (e.g., a completed form). The respondent image is registered against the template image to establish correspondence between pixels of the respondent image and pixels of the template image. A determination is made whether to keep the pixels in the respondent image by applying a threshold comparison with respect to their corresponding pixels in the template image, wherein the threshold comparison at least assesses color similarity between corresponding pixels in the respondent and template images. Pixels are removed from the respondent image based on the threshold comparison to obtain a color form dropout image including only pixels associated with the respondent information. In this manner the color form background is removed leaving the respondent information. Removal of the color form background may be enhanced in some circumstances by dilating the template image to obtain a dilated template image, and when determining whether to keep the pixels in the respondent image, the dilated template image may be used in place of the template image.

A simple linear distance threshold comparison (e.g., fixed spherical boundaries in color space) may be utilized to assess color similarity between corresponding pixels in the respondent and template images. However, use of simple linear distance thresholds may be overly restrictive and can result in excessive removal of respondent information with complex background. Accordingly, in one embodiment, the method of the present invention utilizes a geometric solid limit function (also referred to herein as a geometric solid threshold comparison) that assesses both color similarity and relative darkness between corresponding pixels such as, for example, a paraboloid whose axis is oriented through the origin of a color space (0,0,0 or black). In one embodiment, the color space is a red-green-blue color space, but different color spaces may be employed in other embodiments including, for example, cyan-magenta-yellow-key/black (CMYK), hue saturation value (HSV), or hue lightness saturation (HLS) color spaces. Furthermore, in addition to paraboloids, other geometric solids that assess both color similarity and relative darkness may be utilized including, for example, ellipsoids and cones.

According to another aspect of the present invention, a system for processing an image of a color form having respondent information entered thereon to remove the color background from the form includes a data storage device and a processor. The data storage device and the processor may, for example, be included within a computer system (e.g., a desktop or laptop computer) or they may, for example, be included within separate computer systems connectable with one another via a local area network and/or a wide area network.

The data storage device includes a template image and a respondent image stored thereon. The template image is comprised of a plurality of pixels representing the form without any respondent information entered thereon (e.g., a blank form), and the respondent image is comprised of a plurality of pixels representing the form and the respondent information entered thereon (e.g., a completed form). In order to generate the respondent and template images, the system may also include a color enabled scanning device operable to generate the template image from a blank copy of the form and to generate the respondent images from the color form having respondent information entered thereon.

The processor is enabled to retrieve the template and respondent images from the data storage device. The processor is operable to register the respondent image against the template image to establish correspondence between pixels of the respondent image and pixels of the template image. The processor is also operable to determine whether to keep the pixels in the respondent image by applying a threshold comparison with respect to their corresponding pixels in the template image, wherein the threshold comparison at least assesses color similarity between corresponding pixels in the respondent and template images. In this regard, the processor may be enabled to perform a linear distance threshold comparison to determine whether pixels in the respondent image are too similar in color to their corresponding pixels in the template image in order to select pixels in the respondent image associated with the form. However, in one embodiment, the processor is operable to determine whether to keep the pixels in the respondent image by applying a geometric solid threshold comparison that assesses both color similarity and relative darkness between corresponding pixels. The geometric solid may, for example, be a paraboloid, but other geometric solids are suitable including, for example, ellipsoids and cones. The processor may perform the geometric solid threshold comparison within, for example, an RGB color space, although other color spaces such as, for example, CMYK, HSV and HLS color spaces, may be utilized.

The processor is further operable to remove pixels from the respondent image based on the threshold comparison to obtain a color form dropout image including only pixels associated with the respondent information. To enhance removal of the color form background in some circumstances, the processor may also be further enabled to dilate the template image to obtain a dilated template image, and the dilated template image may be used by the processor in place of the template image when determining whether to keep pixels in the respondent image.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIG. 2 illustrates an exemplary template image;

FIG. 3. illustrates an exemplary respondent image;

FIG. 4. illustrates an exemplary dilated template image;

DETAILED DESCRIPTION

Figure 1:
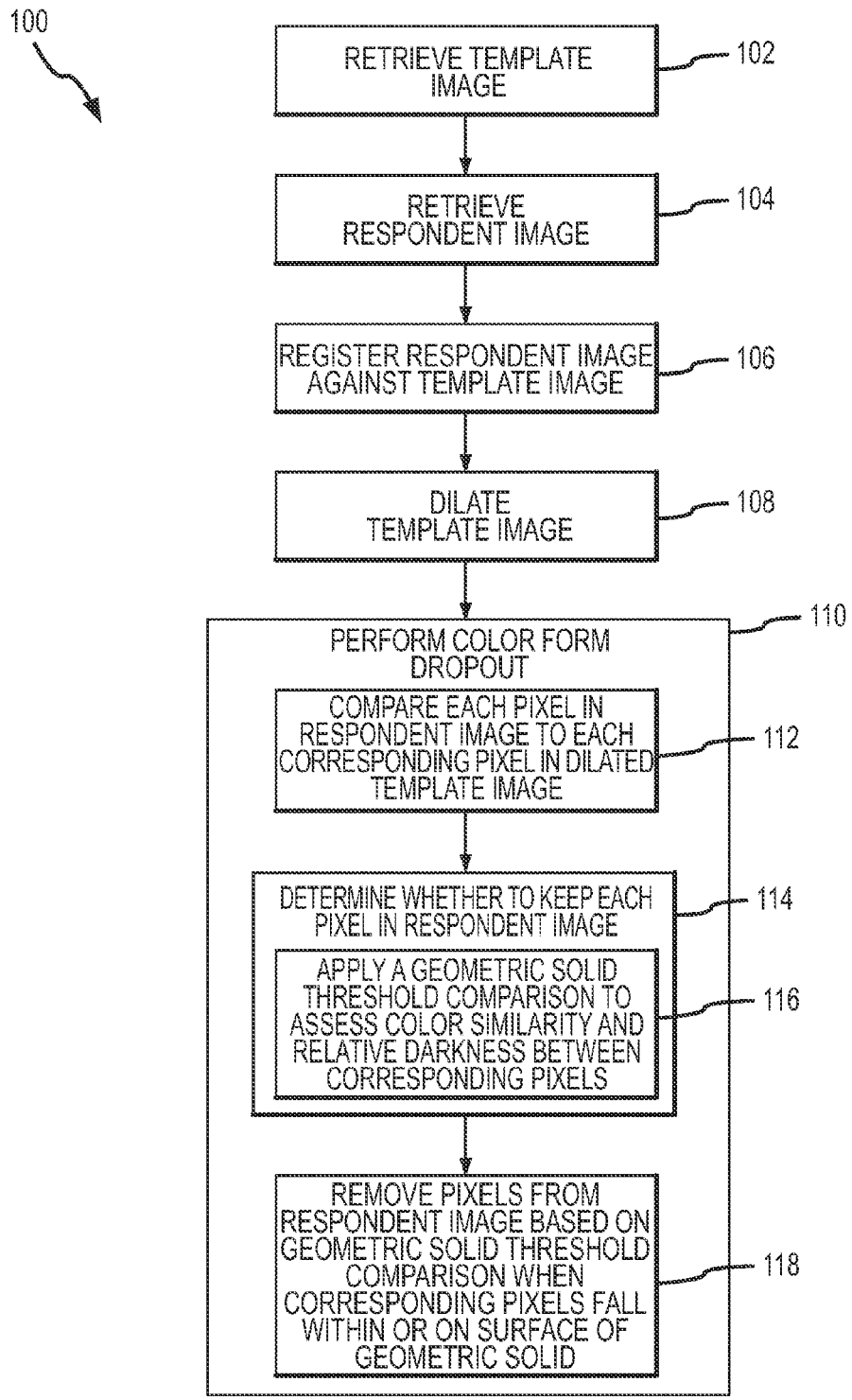
FIG. 1 illustrates one embodiment of a color form image processing method in accordance with the present invention.

Referring to FIG. 1, there is shown one embodiment of a color form image processing method (100) for removing the color background from the form to obtain an accurate color representation of respondent information entered thereon. Although the color form image processing method (100) is described in the context of processing a form having a single page, the color form image processing method (100) may easily be extended to forms with multiple pages or forms having information entered on the front and back of one or more pages by, for example, processing an image of each page and/or side thereof.

The color form image processing method (100) begins with retrieving a template image (102). A template image comprises a scanned image of a form page without any written respondent information thereon (e.g., an image of a blank form). FIG. 2 shows an exemplary template image 200. The template image 200 may be stored in any of a number of proprietary or non-proprietary color image file formats and is comprised of numerous color pixels representing the form.

The method (100) continues with retrieving a corresponding respondent image (104). The respondent image comprises a scanned image of the form page that has been filled out by a respondent (or someone completing the form on behalf of the respondent). FIG. 3 shows an exemplary respondent image 300. The respondent image 300 has the same layout as the template image 200 but includes the respondent entered information that needs to be extracted from the completed form. The respondent image 300 may likewise be stored in any of a number of proprietary or non-proprietary color image file formats and is comprised of numerous color pixels representing the form as well as the respondent entered information.

The respondent image 300 is registered (106) against the template image 200. Registration (106) is done to correct skew, misalignment, or distortion caused by the scanning process. Registration (106) may be accomplished in a manner known to those skilled in the art by, for example, aligning the respondent image 300 to the template image 200. Registration (106) establishes correspondence between pixels in the respondent image 300 and the template image 200.

The method (100) also includes the step of dilating (108) the template image 200. The template image 200 is dilated (108) in order to increase the width and height of darker components within the template image 200. Dilation (108) helps overcome minor misalignments that may still be present after registration (106) and also compensates for minute variations in the printing process. Dilation (108) is especially useful in increasing the area around the printed text on the template form 200. FIG. 4 shows an exemplary dilated template image 400 corresponding with the template image 200 of FIG. 2. The dilated template image 400 is used for the color form dropout steps described herein. However, in other embodiments the non-dilated template image 200 may be used instead of the dilated template image 400.

Figure 5:
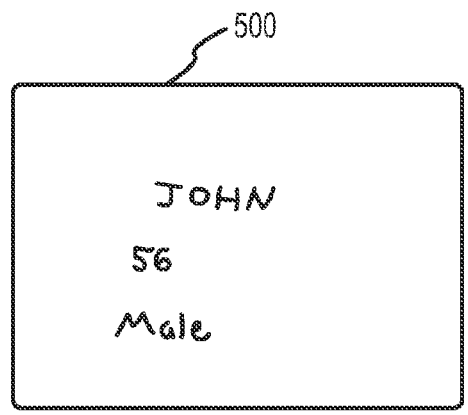
FIG. 5. illustrates an exemplary dropout image.

The method (100) continues with the step of performing a color form dropout (110) wherein pixels in the respondent image 300 associated with the form instead of with respondent information are identified and removed from the respondent image 300. In this regard, performance of the color form dropout step (110) involves comparing (112) each pixel in the registered respondent image 300 to its corresponding pixel in the dilated template image 400. For each compared pixel in the respondent image 300, it is determined (114) whether the pixel should be kept in or removed from the respondent image 300. This determination may be made by applying (116) a geometric solid threshold comparison to assess the similarity of the color of the respondent image 300 pixel to the corresponding dilated template image 400 pixel as well as relative color darkness between the respondent and dilated template image 300, 400 pixels. If the respondent image 300 pixel and its corresponding dilated template pixel 400 do not satisfy the geometric solid threshold comparison, then the pixel is removed (118) from the respondent image 300. This eliminates the form from the respondent image 300. It should be noted that pixels typically should not be compared by exact color because the color values detected on successive scans may vary. An exemplary dropout image 500 after completion of the color form dropout step (110), which comprises the respondent image 300 without the pixels selected for removal is illustrated in FIG. 5.

Figure 6:
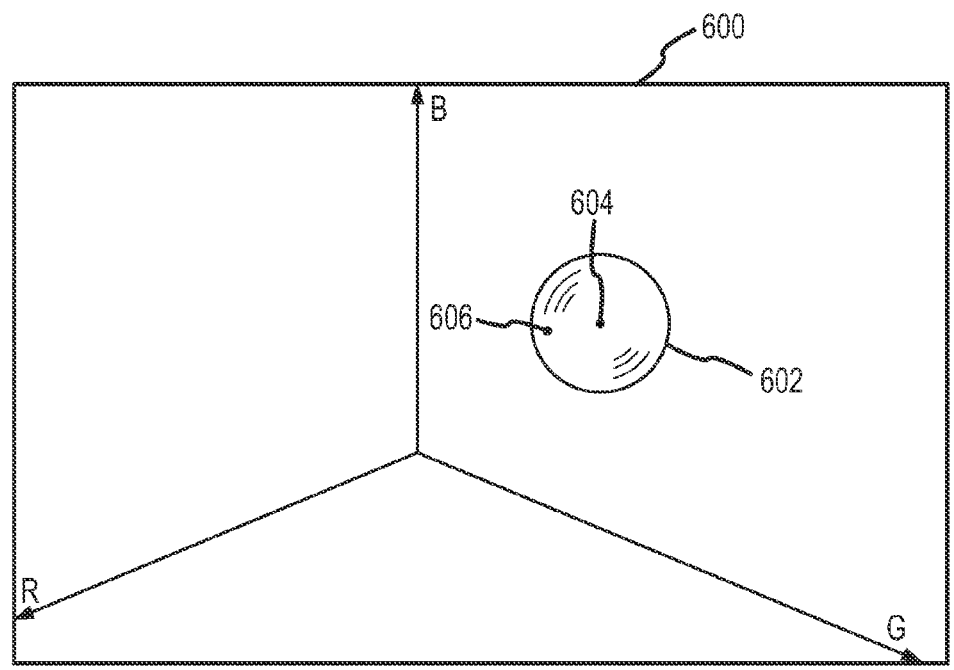
FIG. 6 illustrates an exemplary spherical distance comparison between pixels in the dilated template and respondent images within an RGB color space.

In performing the color form dropout (110), the red-green-blue (RGB) color space is utilized. However, the color form dropout (110) can be made utilizing alternate color spaces (e.g., CMYK, HSV, or HLS color spaces). As shown in FIG. 6, the RGB color space 600 can be thought of as having three dimensions with each dimension representing one of the color components: Red (the R-axis in FIG. 6), Green (the G-axis in FIG. 6), or Blue (the B-axis in FIG. 6). The pixels from the respondent and dilated template images (300, 400) can be thought of as points plotted in the three-dimensional RGB color space 600. The origin (0,0,0) represents the color black. The color white is represented as the point with the maximum value of all color components. In this regard, where 8 bits are used to represent each RGB component of the color, the RGB value set (255, 255, 255) represents the color white. It should be noted that a different number of bits may be used to represent each RGB component.

Figure 7:
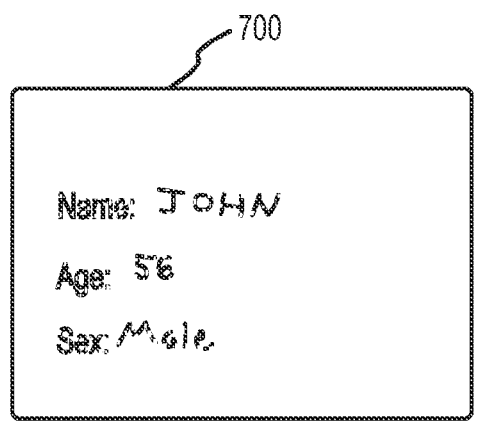
FIG. 7 illustrates an exemplary form dropout image after applying a spherical distance comparison.

To assess only color similarity of the respondent and dilated template image 300, 400 pixels, the distance in the three-dimensional RGB color space 600 between the two points can be used and compared to a threshold value. The threshold value essentially creates a spherical boundary 602 around the respondent pixel 604. In this regard, the foregoing pixel color similarity comparison may also be referred to herein as the basic pixel distance comparison or the spherical distance comparison, and is an example of a simple linear distance threshold comparison. If the dilated template pixel 606 falls within or on this sphere 602, the respondent and dilated template pixels 604, 606 are considered too similar in color and the respondent image pixel 604 is removed from the respondent image 300. If corresponding dilated template pixel falls outside sphere 602, the corresponding respondent and dilated template pixels are not considered too similar in color and the respondent image pixel is not removed from the respondent image 300 based on being too similar in color to its corresponding dilated template image pixel. FIG. 7 shows an exemplary respondent image after removal of pixels therefrom based on the spherical distance comparison. Such image is referred to herein as the spherical distance form dropout image 700.

The resulting image 700 from the spherical distance comparison may still not achieve the desired level of color form dropout accuracy. In this regard, the spherical distance comparison typically does not account for many of the pixels that fall on the dilated or misaligned portion(s) of the dilated template image 400. These pixels may be very far apart in color similarity. The dilated template image 400 pixel could be black while the corresponding respondent image 300 pixel may be white. These pixels are as far apart in color as possible but the respondent image 300 pixel still needs to be removed.

Figure 8A:
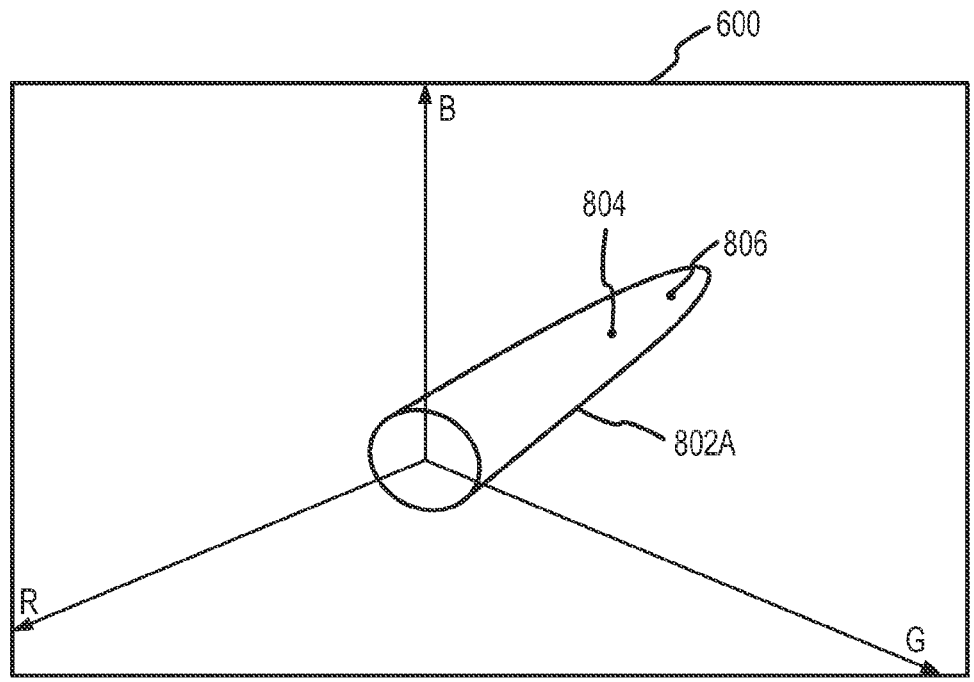
FIG. 8A illustrates an exemplary paraboloid threshold comparison between pixels in the dilated template and respondent images within an RGB color space.
Figure 8B:
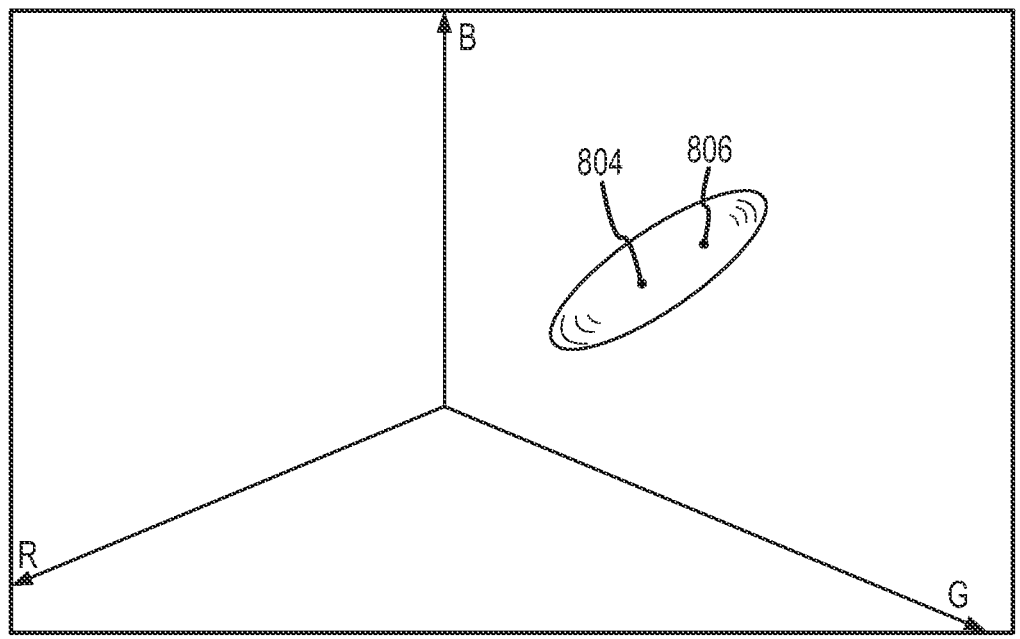
FIG. 8B illustrates an exemplary ellipsoid threshold comparison between pixels in the dilated template and respondent images within an RGB color space.
Figure 8C:
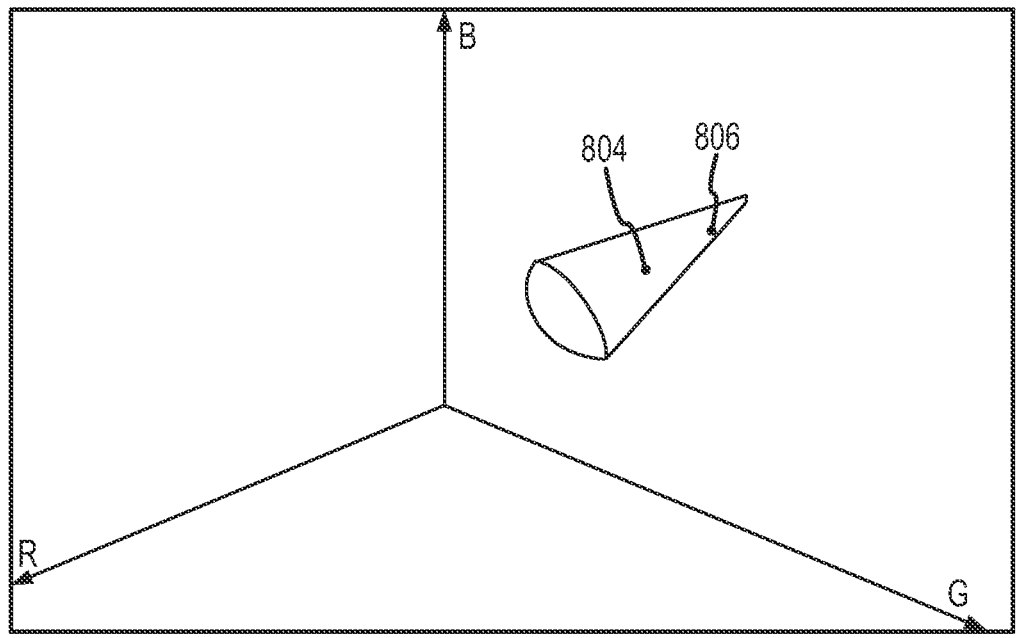
FIG. 8C illustrates an exemplary conical threshold comparison between pixels in the dilated template and respondent images within an RGB color space.

In order to properly address the impacts of dilated pixels, a boundary shape defining a geometric solid that considers both color similarity (distance) and darkness (distance to black) may be utilized. One example of such a boundary shape defining a geometric solid that accomplishes this is the paraboloid 802A, an example of which is shown in FIG. 8A. Other suitable boundary shapes include an ellipsoid 802B, one example of which is shown in FIG. 8B, and a cone 802C one example of which is shown in FIG. 8C.

The basic form of the equation describing a paraboloid (along the z axis) is: $z=x^2+y^2$. The $x^2+y^2$ side of the equation represents the color similarity of a pixel while the z side of the equation represents the distance of the respondent pixel 804 from black. The geometric solid is often created with the respondent pixel as part of the equation (e.g., as the focus of the paraboloid when the geometric solid is a paraboloid). By adding other factors to the basic paraboloid equation, the position of the peak and width of the cone can be adjusted to meet the needs of the color background dropout process when utilizing the paraboloid 802A to assess whether a respondent pixel 804 from the respondent image 300 is farther from black than its corresponding dilated template image pixel 806 from the dilated template image 400. In practice, the orientation (darkness axis) of the paraboloid 802 is not perpendicular to a single axis but is at an angle to all axes based on the color of the respondent pixel 804. While conceptually simple, this requires the use of coordinate transformations making the implementation more complex.

Figure 9:
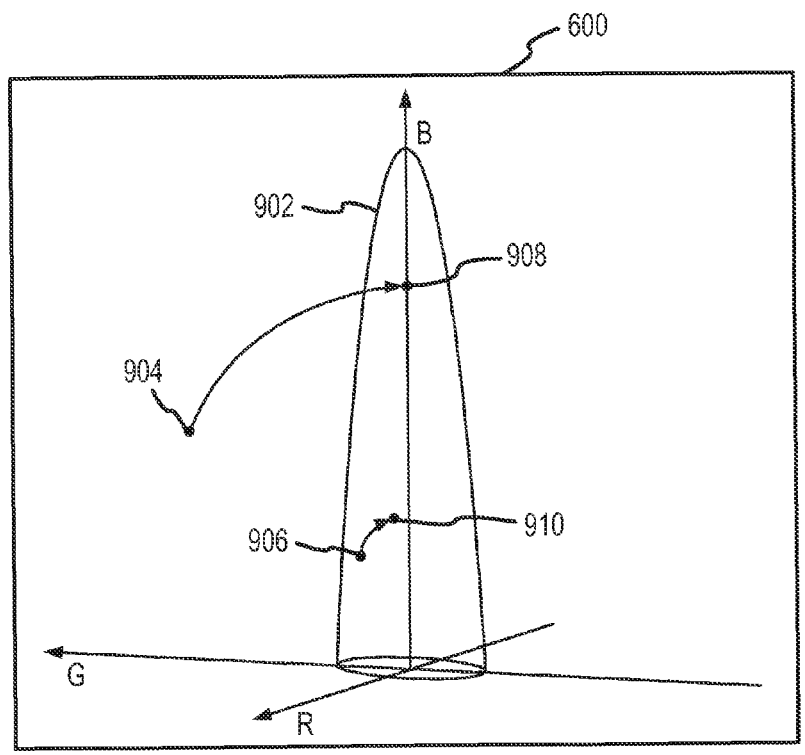
FIG. 9 illustrates an exemplary paraboloid threshold comparison between pixels in the dilated template and respondent images within an RGB color space after rotation of the pixels.

As an alternative to creating a parabolic shape relative to the respondent image pixel, it is mathematically simpler to rotate the respondent image pixel so that it falls on one of the axes (e.g., the B-axis is used for simplicity). Thereafter, a paraboloid 902 may be created around the rotated respondent pixel using a standard parabolic equation:

$$b=-c(r^2+g^2)+h+d$$

where:
   b=blue value of pixel
   r=red value of pixel
   g=green value of pixel c=curvature of the paraboloid
h=distance from the respondent pixel to the origin
d=acceptable color distance threshold In this regard, rotation matrices may be used to get the dilated template and respondent pixels to appropriate positions where the standard equation for a geometric solid can be used. FIG. 9 shows an exemplary paraboloid 902 defined after rotation of the respondent and dilated template pixels 904, 906 to their appropriate rotated respondent and dilated template 908, 910 positions. Similar rotations can be done for ellipsoids, cones and other suitable geometric solids.

To assess whether the dilated template image pixel 906 is closer to black than the respondent pixel 904, the transformed RGB components of the rotated dilated template image pixel 908 are substituted into the RGB variables (r,g,b) of the equation $(b=-c(r^2+g^2)+h+d)$ defining the paraboloid 902. The outcome of this calculation may be used to determine if the dilated template pixel 906 falls inside/outside or on the surface of the paraboloid 902. For example, the equation defining the paraboloid 902 may be rewritten as follows:

$$0=-c(r^2+g^2)+h+d-b$$

Using the rewritten equation of the paraboloid 902, the following three conditions can be established for making the following parabolic threshold comparison:

(1) where $-c(r^2+g^2)+h+d-b=0$, the dilated template pixel 906 is on the paraboloid 902;

(2) where $-c(r^2+g^2)+h+d-b>0$, the dilated template pixel 906 is inside the paraboloid 902; and (3) where $-c(r^2+g^2)+h+d-b<0$, the dilated template pixel 906 is outside the paraboloid 902.

Any dilated template pixel that falls on or inside the paraboloid 902 is below the specified threshold and its corresponding respondent pixel should be removed. All template pixels that fall outside of the paraboloid 902 differ in color properties beyond the specified threshold and their corresponding respondent pixels should not be removed based on the parabolic threshold determination. Similar calculations can be done for ellipsoids, cones and other suitable geometric solids.

In making the parabolic threshold determination, the paraboloid 902 can easily be dynamically altered to change the thresholds for dropping out a pixel from the respondent image 300 by modifying, for example, the values for the curvature (c) and the color threshold (d) in the equation describing the paraboloid 902. Additionally, as various corresponding pixels within the respondent and dilated template images 300, 400 are processed, the variables in the equation describing the paraboloid 902 can be dynamically modified to process sections of the images 300, 400 differently. The color form dropout (110) can also be dynamically modified to detect specific colors used by the respondent in completing the form. For example, if the color used to enter the respondent information is known, the variables can be dynamically modified to achieve a more accurate form dropout. Similar variable changes can be done for ellipsoids, cones and other suitable geometric solids.

Figure 10:
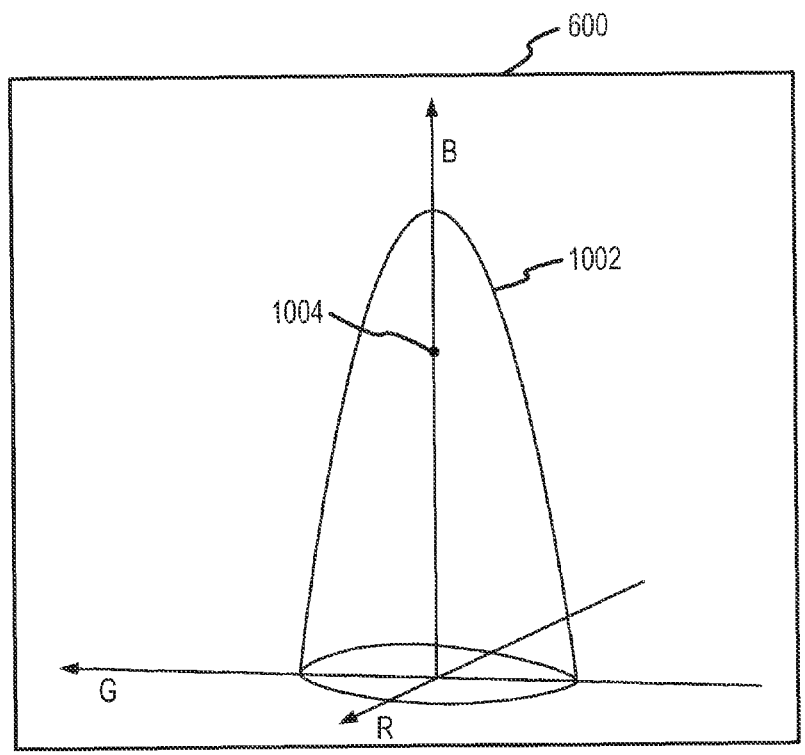
FIG. 10 illustrates an exemplary wide dropout range paraboloid threshold comparison within an RGB color space after rotation of the respondent pixel.

Further improvements can be obtained where the color used to enter the respondent information is determined to be very different than the background color of the form. In such instances, a paraboloid having a wide dropout range can be used since there is little chance of eliminating valid respondent data with a wider range because the colors of the respondent pixels and dilated template image pixels have been determined to be significantly different. FIG. 10 illustrates an exemplary wide dropout range paraboloid 1002 drawn relative to a rotated respondent pixel 1004. Similarly, ellipsoids, cones and other suitable geometric solids having wide dropout ranges can be used.

Figure 11:
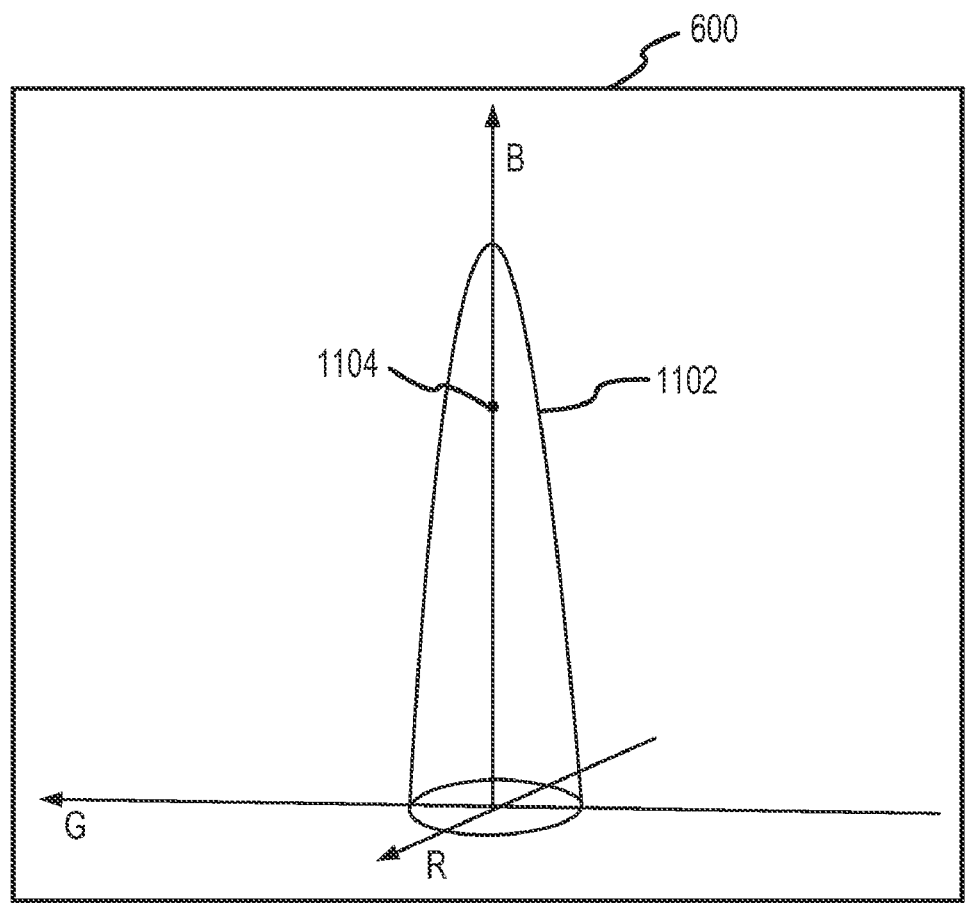
FIG. 11 illustrates an exemplary tight dropout range paraboloid threshold comparison within an RGB color space after rotation of the respondent pixel.

Further improvements can also be obtained where the color used to enter the respondent information is determined to be very similar to the background color. In such instances, a paraboloid having a tight dropout range can be used so that colors differing only slightly from the background image are retained. FIG. 11 illustrates an exemplary tight dropout range paraboloid 1102 drawn relative to a rotated respondent pixel 1104. Similarly, ellipsoids, cones and other suitable geometric solids having tight dropout ranges can be used.

Figure 12:
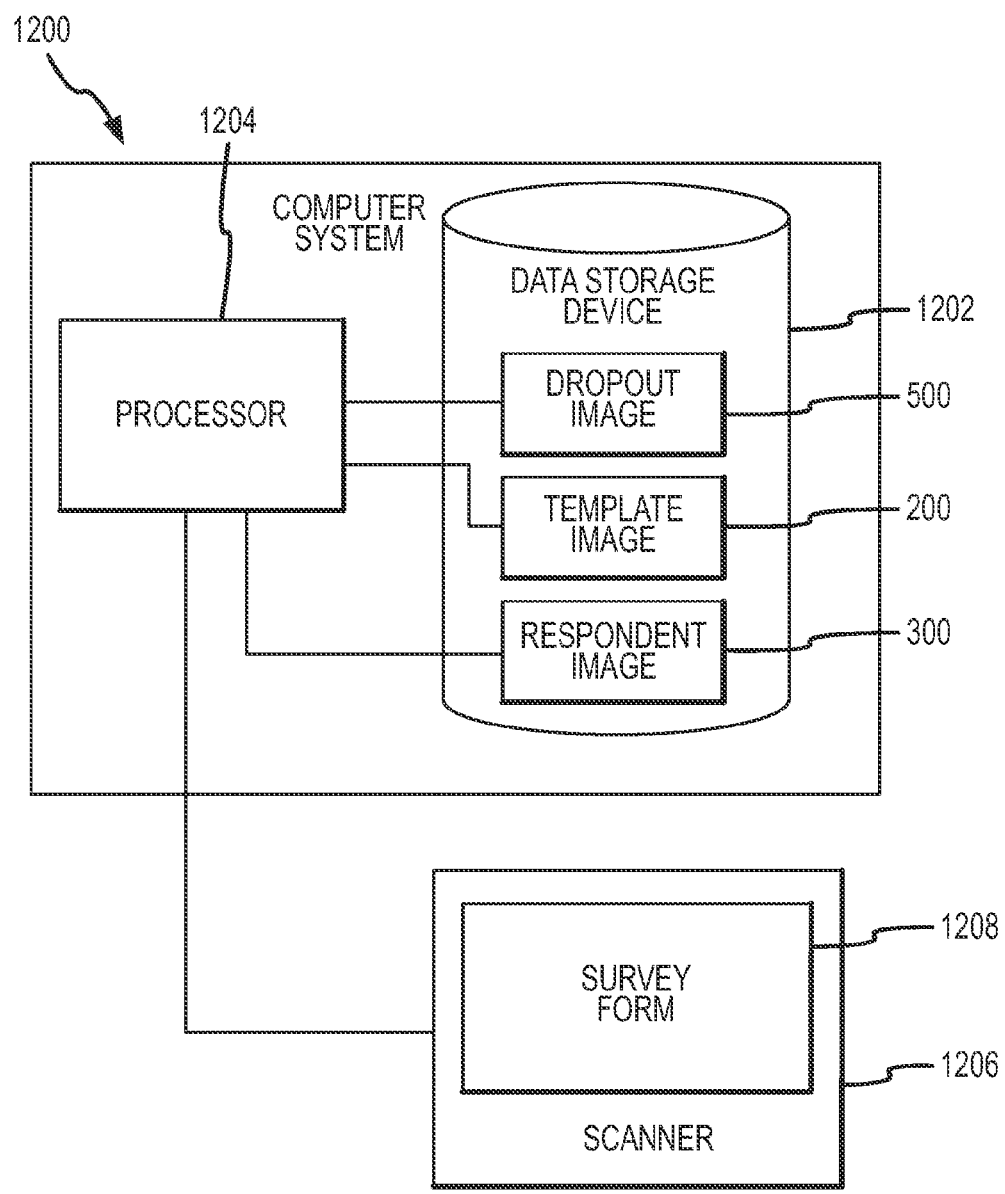
FIG. 12 illustrates one embodiment of a system for removing the color background from a color form in accordance with the present invention.

Referring now to FIG. 12 there is shown one embodiment of a system 1200 for removing the color background from a color form to obtain an accurate color representation of respondent information written thereon. The system includes a data storage device 1202 having a template image 200 and one or more respondent images 300 stored thereon. The system 1200 also includes a data processor 1204 enabled for accessing the template and respondent images 200, 300 stored on the data storage device 1202. The system 1200 may also include a color scanner 1206 operable to create the template and respondent images 200, 300 from paper copies of the original completed forms 1208. As may be appreciated, system 1200 may comprise components of a computer system or the like.

The data processor 1204 is enabled for implementing a color form image processing method (100) such as previously described in connection with FIG. 1 in order to process the respondent image(s) 300 to remove color background pixels therefrom and obtain one or more dropout images 500 that may be stored on the data storage device 1202 for later retrieval and processing (e.g., optical character recognition). In this regard, the color form image processing method (100) may be implemented as a software program, the instructions of which are stored on the data storage device 1202 and are executable by the data processor 1204.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for processing an image of a color form having respondent information entered thereon to remove a color background from the form, said method comprising:
  executing software program instructions with a processor to perform the steps of:
    retrieving a template image of a blank form, the template image comprising a plurality of pixels representing the form without any respondent information entered thereon;
    retrieving a respondent image of a completed form, the respondent image comprising a plurality of pixels representing the form and the respondent information entered thereon;
    registering the respondent image against the template image to establish correspondence between pixels of the respondent image and pixels of the template image;
    determining whether to keep the pixels in the respondent image by applying a geometric solid threshold comparison with respect to their corresponding pixels in the template image, wherein the geometric solid threshold comparison assesses both color similarity and relative darkness between corresponding pixels in the respondent and template images, and wherein the geometric solid comprises one of a paraboloid and a cone; and removing pixels from the respondent image based on the geometric solid threshold comparison to obtain a color form dropout image including pixels only associated with the respondent information.

2. The method of claim 1 wherein in said step of determining, the geometric solid threshold comparison includes rotating corresponding pixels in the respondent and template images within a color space.

3. The method of claim 2 wherein the color space comprises a RGB, CMYK, HSV or HLS color space.

4. The method of claim 1 further comprising:

dilating the template image to obtain a dilated template image; and wherein in said step of determining, the dilated template image is used in place of the template image.

5. A system for processing an image of a color form having respondent information entered thereon to remove the color background from the form, said system comprising:

a data storage device having a template image and a respondent image stored thereon, the template image corresponding with a blank form and comprising a plurality of pixels representing the form without any respondent information entered thereon and the respondent image corresponding with a completed form and comprising a plurality of pixels representing the form and the respondent information entered thereon; and a processor enabled to retrieve the template and respondent images from the data storage device;

wherein said processor is operable to:

register the respondent image against the template image to establish correspondence between pixels of the respondent image and pixels of the template image;

determine whether to keep the pixels in the respondent image by applying a geometric solid threshold comparison with respect to their corresponding pixels in the template image, wherein the geometric solid threshold comparison assesses both color similarity and relative darkness between corresponding pixels in the respondent and template images, and wherein the geometric solid comprises one of a paraboloid and a cone; and remove pixels from the respondent image based on the geometric solid threshold comparison to obtain a color form dropout image including pixels only associated with the respondent information.

6. The system of claim 5 wherein said data storage device and said processor are included within a computer system.

7. The system of claim 5 further comprising:

a color enabled scanning device operable to generate the template image from a blank copy of the form and to generate the respondent image from the color form having respondent information entered thereon.

8. The system of claim 5 wherein said processor is enabled to rotate corresponding pixels in the respondent and template images within a color space when applying the geometric solid threshold comparison.

9. The system of claim 8 wherein the color space comprises a RGB, CMYK, HSV or HLS color space.

10. The system of claim 5 wherein said processor is further enabled to dilate the template image to obtain a dilated template image, and wherein said processor uses the dilated template image in place of the template image when determining whether to keep pixels in the respondent image.

11. A system for processing an image of a color form having respondent information entered thereon to remove the color background from the form, said system comprising:

first means for storing a template image of a blank form, said template image comprising a plurality of pixels representing the color form without any respondent information entered thereon;

second means for storing a respondent image of a completed form, said respondent image comprising a plurality of pixels representing the color form and the respondent information entered thereon;

means for registering the respondent image against the template image to establish correspondence between pixels of the respondent image and pixels of the template image;

means for determining whether to keep the pixels in the respondent image by applying a geometric solid threshold comparison with respect to their corresponding pixels in the template image, wherein the geometric solid threshold comparison assesses both color similarity and relative darkness between corresponding pixels in the respondent and template images and wherein the geometric solid comprises one of a paraboloid and a cone; and means for removing pixels from the respondent image based on the geometric solid threshold comparison to obtain a color form dropout image including only pixels associated with the respondent information.

12. The system of claim 11 wherein said first means for storing and said second means for storing comprise a data storage device of a computer system and wherein said means for registering, said means for determining, and said means for removing comprise a processor of the computer system.

13. The system of claim 11 further comprising:

means for obtaining the template and respondent images.

14. The system of claim 13 wherein said means for obtaining the template and respondent images comprise a color enabled scanning device.

15. The system of claim 11 wherein said means for determining are enabled for rotating corresponding pixels in the respondent and template images within a color space when applying the geometric solid threshold comparison.

16. The system of claim 15 wherein the color space comprises a RGB, CMYK, HSV or HLS color space.

17. The system of claim 11 further comprising:

means for dilating the template image to obtain a dilated template image, and wherein said means for comparing use the dilated template image in place of the template image when determining whether to keep pixels in the respondent image.

* * * * *